United States Patent [19]

Russell

[11] Patent Number: 4,890,184

[45] Date of Patent: Dec. 26, 1989

[54] MOLDED CASE CIRCUIT BREAKER ACTUATOR-ACCESSORY UNIT

[76] Inventor: Ronald R. Russell, 46 Metacomet Rd., Plainville, Conn. 06062

[21] Appl. No.: 292,074

[22] Filed: Dec. 30, 1988

[51] Int. Cl.⁴ .............................................. H02H 3/24
[52] U.S. Cl. ........................................ 361/87; 361/90; 361/92; 335/20
[58] Field of Search ................ 361/58, 86, 87, 90–92, 361/102, 111; 335/20

[56] References Cited

U.S. PATENT DOCUMENTS

| | | |
|---|---|---|
| 3,740,738 | 6/1973 | Kosanovich et al. .................. 361/92 |
| 4,368,499 | 1/1983 | Stiftar .................................... 361/90 |
| 4,589,052 | 5/1986 | Dougherty ........................... 361/94 |
| 4,622,444 | 11/1986 | Kandatsu et al. .................... 200/303 |
| 4,641,117 | 2/1987 | Willard ................................. 335/7 |
| 4,679,019 | 7/1987 | Todaro et al. ....................... 335/172 |
| 4,700,161 | 10/1987 | Todaro et al. ....................... 335/172 |
| 4,728,914 | 3/1988 | Morris et al. ........................ 335/6 |
| 4,786,885 | 11/1988 | Morris et al. ........................ 335/202 |
| 4,788,621 | 11/1988 | Russell et al. ....................... 361/115 |
| 4,794,356 | 12/1988 | Yu et al. . | |
| 4,833,563 | 5/1989 | Russell ................................ 361/187 |

FOREIGN PATENT DOCUMENTS 2033177  5/1980  United Kingdom .

OTHER PUBLICATIONS

Ser. No. 163,589 entitled "Molded Case Circuit Breaker Actuator-Accessory Unit", filed 3/3/88, Castonguay et al., Docket 41PR-6643.

Ser. No. 176,589 entitled "Molded Case Circuit Breaker Actuator-Accessory Module", filed 4/1/88, Ronald R. Russell, Docket 41PR-6662.

Primary Examiner—Todd E. DeBoer
Attorney, Agent, or Firm—Richard A. Menelly; Walter C. Bernkopf; Fred Jacob

[57] ABSTRACT

An integrated protection unit is a circuit breaker which includes basic overcurrent protection facility along with selective electrical accessories. A molded plastic accessory access cover secured to the integrated protection unit cover protects the accessory components contained within the integrated protection unit cover from the environment. A combined overcurrent trip actuator and multiple accessory unit is either field-installed or factory-installed within the integrated protection unit. One such actuator-accessory unit includes a fast release overcurrent trip circuit.

12 Claims, 3 Drawing Sheets

MOLDED CASE CIRCUIT BREAKER ACTUATOR-ACCESSORY UNIT

BACKGROUND OF THE INVENTION

The trend in the circuit protection industry is currently toward complete circuit protection which is accomplished by the addition of supplemental protection apparatus to standard overcurrent protective devices, such as molded case circuit breakers. U.S. Pat. No. 4,622,444 entitled "Circuit Breaker Housing and Attachment Box" describes an accessory that can be field-installed within a circuit breaker without interfering with the integrity of the circuit breaker internal components. This is accomplished by mounting the accessories within a recess formed in the circuit breaker enclosure cover.

An electronic trip actuator which is mounted within the circuit breaker enclosure is described within U.S. Pat. No. 4,679,019 entitled "Trip Actuator for Molded Case Circuit Breakers". The circuit breaker actuator responds to trip signals generated by an electronic trip unit completely contained within a semi-conductor chip such as that described within U.S. Pat. No. 4,589,052. The development of a combined trip actuator for both overcurrent protection as well as accessory function is found within U.S. Pat. No. 4,700,161 entitled "Combined Trip Unit and Accessory Module for Electronic Trip Circuit Breakers". The aforementioned U.S. Patents which represent the advanced state of the art of circuit protection devices are incorporated herein for reference purposes.

A shunt trip accessory unit allows the circuit breaker operating mechanism to be articulated to separate the circuit breaker contacts, usually to perform a tripping function for electrical system control and protection. One such shunt trip accessory unit is described within U.S. Pat. No. 4,786,885 entitled "Molded Case Circuit Breaker Shunt Trip Unit". An auxiliary switch accessory unit allows an operator to determine the "ON" or "OFF" conditions of the molded case circuit breaker contacts at a remote location by means of an audible alarm or visible display. One such auxiliary switch unit is described within U.S. Pat. No. 4,794,356 entitled "Molded Case Circuit Breaker Auxiliary Switch Unit". Both of the aforementioned U.S. Patents are incorporated herein for purposes of reference.

One example of an undervoltage release circuit is found within United Kingdom Patent Application No. 2,033,177A entitled "Circuit Breaker with Undervoltage Release". The circuit described within this Application applies a large initial current pulse to the undervoltage release coil to drive the plunger against the bias of a powerful compression spring and uses a ballast resistor to limit the holding current to the undervoltage release coil to a lower value. It is believed that the heat generated within this circuit would not allow the circuit to be contained within the confines of the circuit breaker enclosure.

A more recent example of a combined overcurrent trip actuator and multiple accessory unit is described within U.S. Pat. No. 4,788,621 entitled "Molded Case Circuit Breaker Multiple Accessory Unit" which combined overcurrent trip actuator and multiple accessory unit requires a separate mounting recess within the circuit breaker cover to house the printed wire board that carries the accessory control circuit. U.S. patent application Ser. No. 163,589 entitled "Molded Case Circuit Breaker Actuator-Accessory Unit" describes one such combined overcurrent trip actuator and multiple accessory unit wherein the printed wire board and actuatoraccessory unit are both contained within the same mounting recess within the circuit breaker cover. U.S. patent application Ser. No. 176,589 entitled "Molded Case Circuit Breaker Actuator-Accessory Module" describes the use of an opto-isolator to connect between the overcurrent and undervoltage circuits to prevent adverse electrical interaction between the circuits. All of the aforementioned U.S. Patents and Patent Applications are incorporated herein for purposes of reference.

SUMMARY OF THE INVENTION

An integrated protection unit which includes overcurrent protection along with auxiliary accessory function within a common enclosure contains an accessory cover for access to the selected accessory modules to allow field installation of the accessory modules. A combined actuator-accessory unit provides overcurrent along with undervoltage release functions and is arranged along with the printed wire board containing the accessory control circuit within one part of the enclosure. The accessory control circuit includes a solid state switch that provides a low impedance path to the actuator-accessory trip coil while presenting a high impedance path when an overcurrent condition occurs to insure fast release of the actuator-accessory trip coil.

DESCRIPTION OF THE PREFERRED EMBODIMENT

Figure 1:
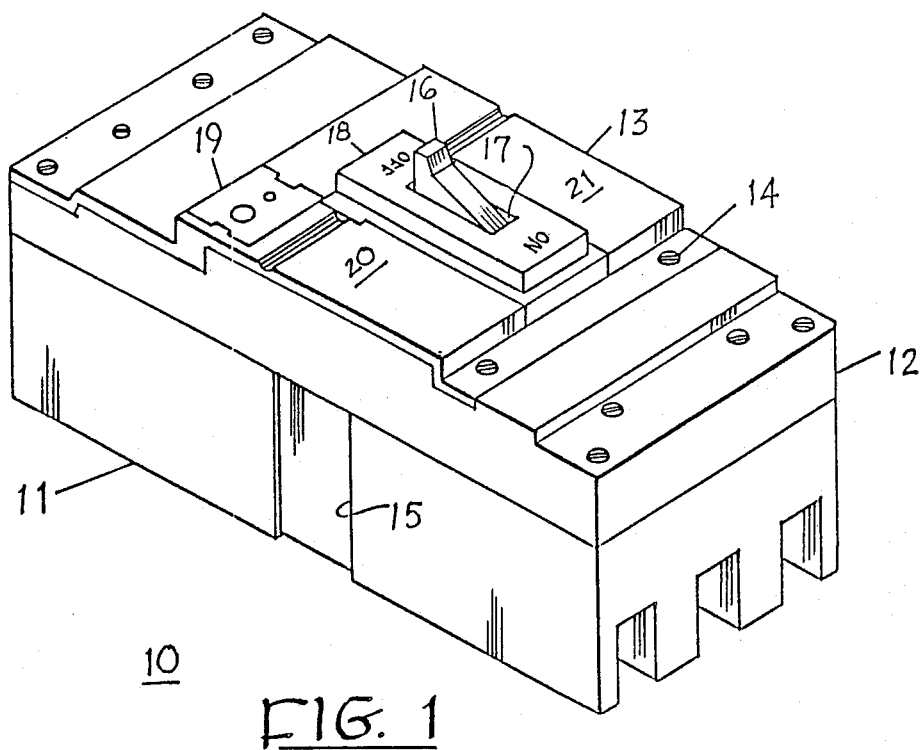
FIG. 1 is a top perspective view of an integrated molded case circuit breaker containing a fast release trip circuit according to the invention.

An integrated circuit breaker 10 consisting of a molded plastic case 11 with a molded plastic cover 12 is shown in FIG. 1 with the accessory cover 13 attached to the circuit breaker cover by means of screws 14. The case includes a wiring slot 15 formed therein for allowing external connection with a remote switch or alarm. The circuit breaker operating handle 16 extends up from an access slot 17 formed in the cover escutcheon 18. A rating plug 19 such as described in U.S. Pat. No. 4,728,914 entitled "Rating Plug Enclosure for Molded Case Circuit Breakers", which Patent is incorporated herein for reference purposes is shown assembled within the accessory cover. A pair of accessory doors 20, 21 are formed in the accessory cover for providing access to the combined electromagnetic actuator and multiple accessory unit 22, hereafter "actuator-accessory unit" contained within the recess 23, shown in FIG. 2. Still referring to FIG. 2, the rating plug 19 is fitted within a recess 24 formed in the accessory cover 13 after the accessory cover is fastened to the circuit breaker cover by means of screws 14, thru-holes 25 and threaded openings 26. Access to the rating plug interior for calibration purposes is made by means of the rating plug access hole 27.

The trip unit for the integrated circuit breaker 10 is contained within a printed wire board 28 which is positioned in the trip unit recess 29. The rating plug 19 when inserted within the rating plug recess interconnects with the printed wire board by means of pins 30 upstanding from the printed wire board and sockets 31 formed on the bottom of the rating plug. An auxiliary switch 32 is positioned within the auxiliary switch recess 33 and is similar to that described in aforementioned U.S. Pat. No. 4,794,356 entitled "Molded Case Circuit Breaker Auxiliary Switch Unit". When the auxiliary switch and trip unit printed wire board have been assembled within their appropriate recesses, the actuator-accessory unit 22 is then installed within recess 23. The actuator-accessory unit includes a housing 34 within which the actuator-accessory coil 35 is enclosed and which further contains a plunger 36 and a plunger spring (not shown) which projects the plunger in a forward trip position against the holding force provided by the energized actuator-accessory coil 35. The actuator-accessory unit is similar to the actuator-accessory unit described within aforementioned U.S. patent application Ser. No. 163,589 wherein a trip actuator latch 37 is pivotally attached to the housing 34. A hook 38 formed at one end of the trip actuator latch cooperates with the circuit breaker operating mechanism as described in aforementioned U.S. Pat. No. 4,700,161 and U.S. patent application Ser. No. 176,589. The operation of the actuator-accessory unit is similar to that described within U.S. Pat. Nos. 4,641,117 and 4,679,019 which Patents are incorporated herein for purposes of reference. The actuator-accessory unit includes a printed wire board 39 which contains the components required for operating the actuator-accessory coil 35 and is connected with a pair of pins 40 upstanding from the trip unit printed wire board 28 by means of connectors 41 which are connected to the actuator-accessory printed wire board. A pair of wire conductors 42 connect the actuator-accessory unit with a voltage source when undervoltage protection is desired and a separate pair of wire conductors 43 connect with a voltage source when a shunt trip function is desired. The actuator-accessory coil 35 internally connects with the actuator-accessory printed wire board 39 by means of a separate pair of wire conductors 44, as indicated.

Figure 3:
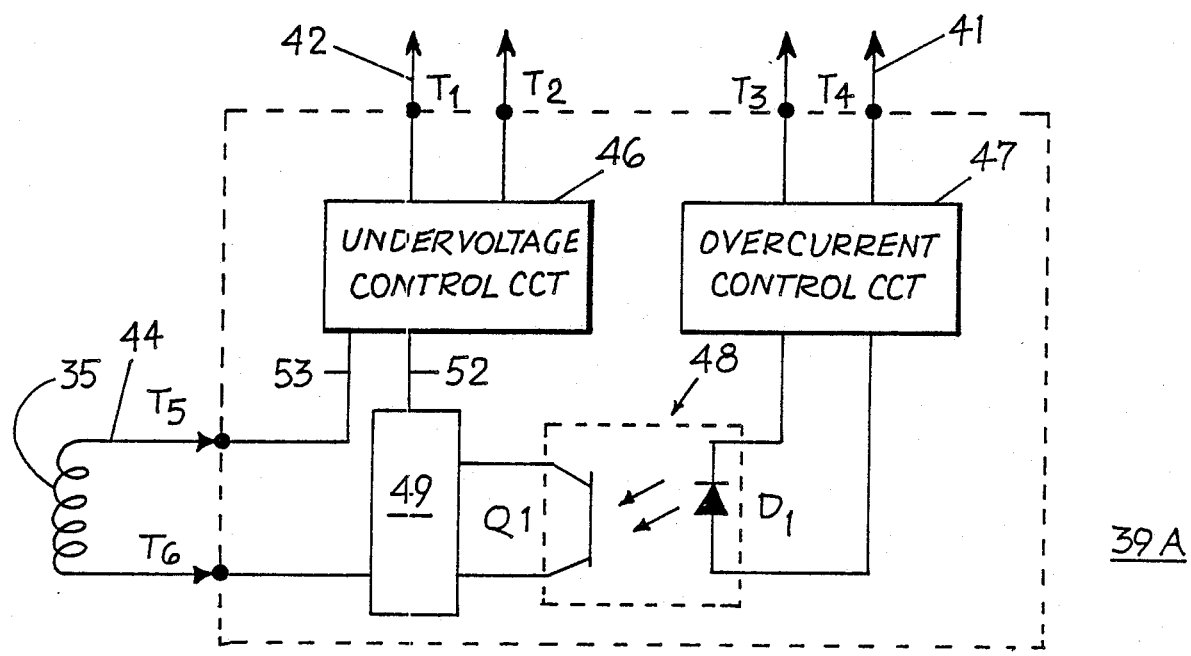
FIG. 3 is a schematic representation of the undervoltage control circuit and overcurrent control circuit used with the integrated circuit breaker shown in FIG. 1 and 2.

When undervoltage release function is required along with overcurrent protection, the circuit depicted at 39A in FIG. 3 is incorporated within the actuator-accessory printed wire board 39 shown earlier. The actuator-accessory coil 35 is connected with the circuit 39A by means of conductors 44 and terminals T5, T6 and is connected with the remote voltage source by means of conductors 42 and terminals T1, T2. The undervoltage control circuit 46 is similar to that described in aforementioned U.S. Pat. No. 4,788,621 and provides a holding current over conductors 44 and terminals T5, T6 to the actuator-accessory coil 35 until the voltage supplied to terminals T1, T2 drops to a predetermined value, at which time the holding current is interrupted and the trip function is initiated, as described earlier. The circuit 39A differs from that described within the aforementioned U.S. patent application Ser. No. 176,589 by the insertion of a solid state switch 49 in series with one side of the actuator-accessory coil 35 and the conductor 52 connecting with the undervoltage control circuit 46. The other conductor 53 directly connects with the other side of the actuator-accessory coil. The solid state switch operates to provide a low impedance to the actuator-accessory coil during normal operation yet provides a high impedance when an overcurrent trip signal is supplied to the actuator-accessory coil. This arrangement overcomes the effects of the coil inductance which would otherwise cause an exponentially slow release of the stored energy and result in a corresponding slow trip response by the actuator-accessory coil. The overcurrent trip function is provided by means of the overcurrent control circuit 47 which interacts with the undervoltage control circuit by means of the opto-isolator 48 consisting of the light-emitting diode $D_1$ and the phototransistor $Q_1$. The overcurrent control circuit connects with the trip unit printed wire board 28 of FIG. 2 by means of terminals $T_3$, $T_4$ which comprise the connectors 41 and which connect with the trip unit printed wire board by means of pins 40, as described earlier.

Figure 2:
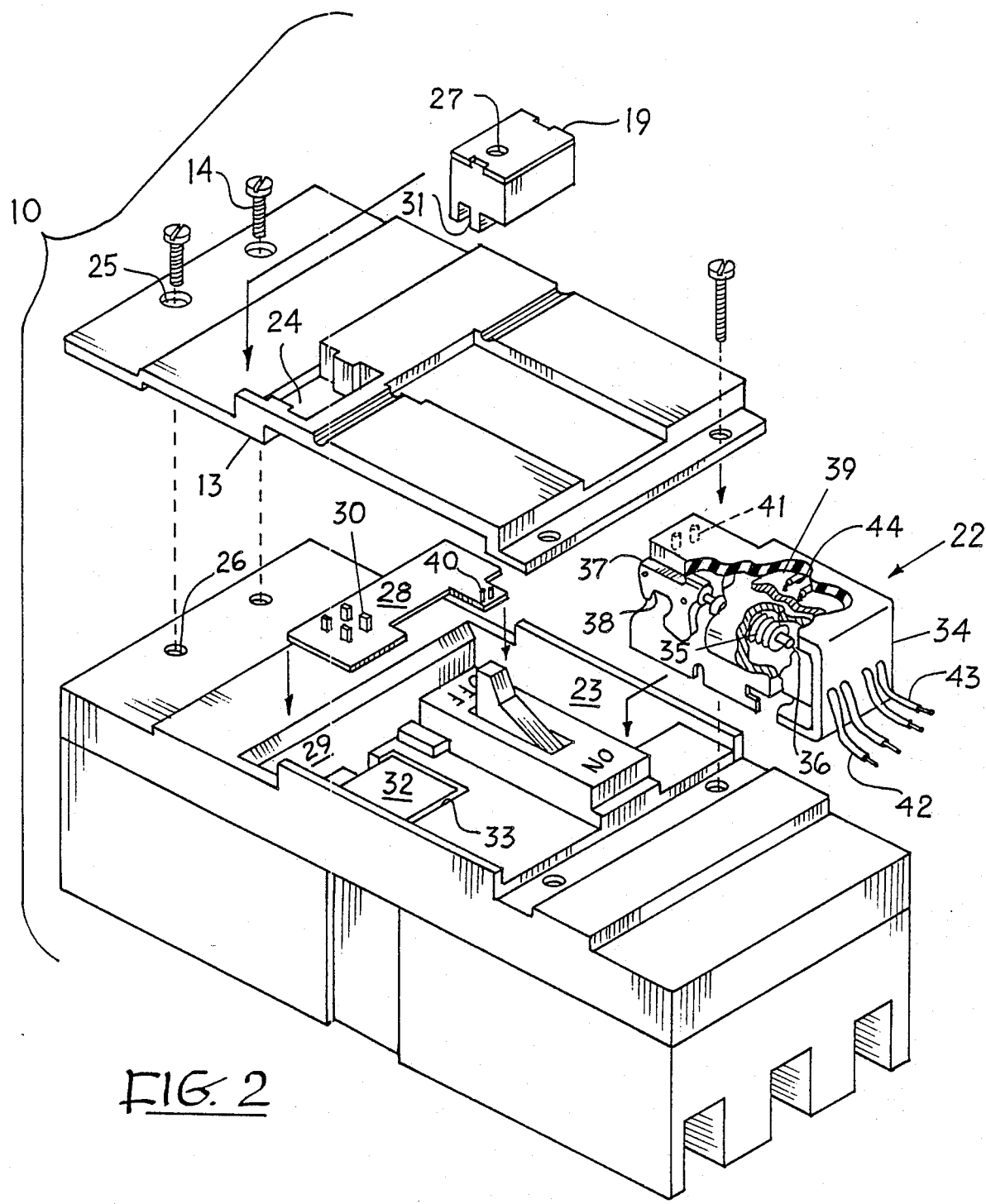
FIG. 2 is an exploded top perspective view of the integrated circuit breaker of FIG. 1 prior to assembly of the combined actuator-accessory unit.
Figure 4:
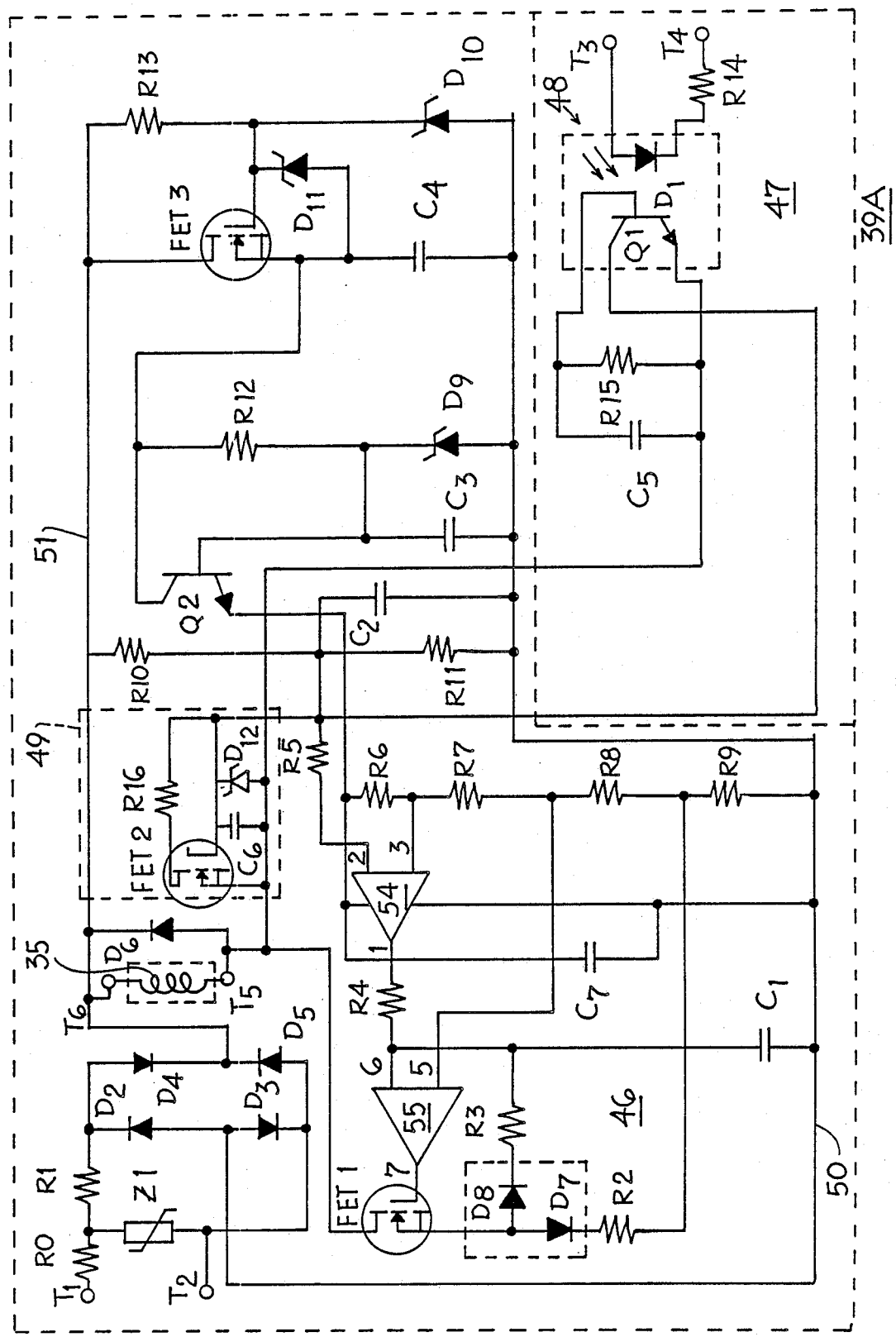
FIG. 4 is a detailed circuit diagram of the undervoltage control circuit and overcurrent control circuit of FIG. 3.

The operation of the undervoltage control circuit 46 and overcurrent control circuit 47 is best seen by referring now to the detailed circuit 39A depicted in FIG. 4. The undervoltage control circuit disables the actuator-accessory coil 35, which is connected within the circuit by means of terminals $T_5$, $T_6$, when the voltage across terminals T1, T2, falls below a predetermined value for a predetermined time. An external voltage source (not shown) is applied to terminals T1, T2 via conductors 42 (FIG. 3) thereby providing current through the current limiting resistors $R_0$, $R_1$ and the rectifier consisting of diodes $D_2$–$D_5$. One output of the rectifier connects with the positive bus 51 and the other output of the rectifier connects with the negative bus 50. A varistor $Z_1$ is connected across the terminals through resistor $R_0$ to protect the undervoltage control circuit from voltage surges. The actuator-accessory coil 35 is connected between the positive bus and the drain terminal of $FET_2$, the source of $FET_2$ connects with the drain of $FET_1$, and the source of $FET_1$ connects with the negative bus through diode $D_7$, and resistors $R_2$, $R_9$. A flyback diode $D_6$ is used to circulate current back through the actuator-accessory coil when $FET_1$ is turned off. Output pin 7 of a comparator 55 connects with the gate of $FET_1$ and input pin 6 of the comparator connects with the source of $FET_1$ through resistor $R_3$ and diode $D_8$. The input pin 6 connects with the negative bus through capacitor $C_1$. The input pin 5 to the comparator connects to the midpoint of the test voltage divider consisting of resistors $R_6$–$R_9$. The chopper circuit, consisting essentially of $FET_1$ and the comparator 55, controls the current to the actuator-accessory coil 35 in the following manner. With $FET_1$ in its "OFF" state, input pin 5 to the comparator 55 is set at 2 volts at the junction of resistors $R_7$ and $R_8$. When the voltage across capacitor $C_1$ is less than 2 volts, the output pin 7 of the comparator is "high", turning on $FET_1$ and allowing holding current to flow through the actuator-accessory coil 35. When $FET_1$ is on, the circuit current through diode $D_7$, develops a proportional voltage across $R_2$ and $R_9$. Capacitor $C_1$ charges to this voltage through diode $D_8$ and resistor $R_3$. Diode $D_7$, in series with resistor $R_2$, provides both voltage and temperature compensation for diode $D_8$ while resistor $R_3$ provides a short time delay during the charging cycle for capacitor $C_1$ so that the comparator 55 does not turn off prematurely due to the occurrence of a current spike during reverse recovery of diode $D_6$. For selected values of $R_2$ and $R_9$ at 30 milliamps circuit current, the voltage developed across $R_2$ and $R_9$ is approximately 3 volts. The voltage across $R_9$ adds to the voltage across $R_8$ to bias input pin 5 of the comparator at approximately 3 volts. When the circuit current exceeds 30 milliamps, capacitor $C_1$ will charge greater than 3 volts driving the output pin 7 of the comparator to a "low" state, thereby turning off $FET_1$. With $FET_1$ off, the voltage on input pin 5 reverts back to the 2 volt reference value. With 3 volts across capacitor $C_1$, the output of the comparator cannot go "high" until the voltage across $C_1$ drops to less than 2 volts. $C_1$ can only discharge through resistor $R_4$ which connects the output pin 1 of a second comparator 54, which is "low". The value of resistor $R_4$ is selected to provide a fixed time delay for the capacitor $C_1$ to decay to 2 volts thereby establishing a fixed off-time for $FET_1$. The circuit current through the actuator-accessory coil is arranged to turn off at approximately 30 milliamps. Diode $D_6$ then circulates the energy stored in the inductance of the actuator-accessory coil in order to maintain the current at a sufficiently high value to prevent the plunger 36 (FIG. 2) from becoming propelled in the forward direction. The circuit current through the actuator-accessory coil decays to approximately 20 milliamps after a predetermined time delay which is determined by the inductive and resistive properties of the actuator-accessory coil. The solid state switch 49 consists of $FET_2$, resistor $R_{16}$, capacitor $C_6$ and zener diode $D_{12}$. The collector of the photo-transistor $Q_1$, within the opto-isolator 48 in the overcurrent control circuit 47 directly connects with the gate of $FET_2$ and connects with the drain of $FET_2$ through resistor $R_{16}$. Capacitor $C_5$ is an RF by-pass filter for $Q_1$ while resistor $R_{15}$ provides noise suppression. The solid state switch, as described earlier, allows the actuator-accessory coil to rapidly respond to a trip signal generated within the overcurrent control circuit 47 by application of a predetermined trip signal to the photodiode $D_1$ by means of terminals $T_3$, $T_4$ through current limiting resistor $R_{14}$ or within the undervoltage control circuit 46 by presenting a low impedance path to the fly-back diode $D_6$ until an overcurrent trip signal clamps the gate-source terminals of $FET_2$, which then appears as a high impedance to diode $D_6$ thereby allowing the actuator-accessory coil to respond immediately. When voltage above a predetermined level is applied to terminals $T_1$, $T_2$ the forward voltage developed across $FET_2$ will forward bias the gate into conduction via $R_{16}$. Zener diode $D_{12}$ clamps the gate-source voltage to protect $FET_2$ from switching transients while $C_6$ provides a high frequency by-pass filter. The undervoltage control circuit 46 also connects with the solid state switch 49 by connecting the drain of $FET_1$ with the anode of the fly-back diode $D_6$ and the source of $FET_2$. The voltage regulation effect of the undervoltage control circuit operates in the manner described within U.S. patent application Ser. No. 176,589 wherein the resistor $R_4$ is selected to discharge capacitor $C_1$ from 3 volts to 2 volts in the same predetermined time delay in the absence of any trip signal to the actuator-accessory coil. After the predetermined time delay, the output pin 7 of comparator 55 goes "high" causing the process just described to repeat itself. If the voltage applied to terminals T1, T2 should at any time drop below a predetermined value, the output pin 1 of the second comparator 54 will go "high" thereby charging the capacitor $C_1$ up to the positive rail voltage of the second comparator, which in turn, drives the output pin 7 of comparator 55 "low" to turn off $FET_1$. Capacitor $C_7$ provides RF by-pass to the comparator. When the voltage across terminals $T_1$, $T_2$ increases, the output pin 1 of the second comparator 54 is "low" causing the capacitor $C_1$ to discharge through resistor $R_4$. As soon as the voltage across capacitor $C_1$ decays to 2 volts, $FET_1$ turns on and the process described earlier is repeated. Resistors $R_{10}$, $R_{11}$ connecting across the positive and negative busses 51, 50 in combination with the second capacitor $C_2$, connecting across $R_{11}$ and with the input pin 2 of second comparator 54 through resistor $R_5$, form a simple averaging circuit producing an approximately constant output voltage across $C_2$. The voltage value across $C_2$ determines the voltage value above which circuit current is applied to the actuator-accessory coil 35, which value is defined herein as the "pick-up" value and below which, current to the actuator-accessory coil will be interrupted, which is defined herein as the "drop-out" value. In operation, the average voltage established across capacitor $C_2$ is applied to the input pin 2 of the second comparator 54 through a current limiting resistor $R_5$. The current limiting resistor $R_5$ limits the current into the input pin 2 when the voltage across $C_2$ exceeds the positive rail voltage applied to the second comparator 54. Input pin 3 of the second comparator 54 is set at approximately 7 volts by the reference voltage divider $R_6$-$R_9$ which determines the voltage appearing at the connection point between $R_6$ and $R_7$. When the voltage across capacitor $C_2$ is below 7 volts, the output pin 1 of the second comparator 54 goes "high" causing the first comparator 55 to interrupt the current to the actuator-accessory coil. Conversely, when the voltage across $C_2$ is greater than 7 volts, the output pin 1 of the second comparator is "low" thereby permitting comparator 55 to apply turn-on voltage to the gate electrode of $FET_1$ which will apply current to the actuator-accessory coil. Resistor $R_{12}$, zener diode $D_9$, transistor $Q_2$ and capacitor $C_3$ serve to regulate the voltage at the emitter of $FET_3$ in the following manner. Resistor $R_{12}$ and zener diode $D_9$ establish a reference voltage for the base of $Q_2$ which in turn, supplies a regulated output voltage to the emitter of $Q_2$ which is applied to input of pin 3 on the second comparator 54 through resistor $R_6$. Resistor $R_{12}$ and the collector of $Q_2$ are connected to one side of a storage capacitor $C_4$. The undervoltage control circuit 46 requires a relatively low level of steady current, in the order of 1 milliampere, to maintain operation of the discrete electronic devices such as $FET_1$, comparators 55, 54 and transistor $Q_2$. A higher level of current, in the order of 30 milliamps, is applied to the actuator-accessory coil to generate sufficient magnetic flux to restrain the plunger 36 (FIG. 2). The 30 milliampere current to the actuator-accessory coil must be maintained while the AC voltage applied to terminals T1, T2 passes through its zero crossing on each half of the AC cycle. This is accomplished by the combination of $FET_3$ with resistor $R_{13}$ and the storage capacitor $C_4$. Resistor $R_{13}$, in series with zener diode $D_{10}$, establishes a 33 volt gate reference voltage at the drain electrode of $FET_3$ which sets a charge level of 30 volts for the storage capacitor $C_4$. When capacitor $C_4$ is less than 30 volts and the AC voltage applied to terminals T1, T2 is greater than 30 volts, the gate electrode of $FET_3$ is positive with respect to the source electrode such that $FET_3$ applies charging current to the storage capacitor $C_4$. As $C_4$ approaches 30 volts, $FET_3$ turns off to apply the low level steady current requirements described earlier.

Accordingly, zener diode $D_{11}$ protects the gate of $FET_3$ from overvoltage conditions in the event that the AC voltage is applied to terminals T1, T2 when the capacitor $C_4$ is completely discharged. With capacitor $C_4$ fully charged, high ambient temperatures would otherwise cause leakage current in $FET_3$ to further charge the capacitor in excess of the rated value of the capacitor. The zener diode $D_{11}$ functions to limit the voltage applied to the storage capacitor $C_4$ to one diode-voltage above the voltage across the zener diode $D_{10}$. Zener diode $D_{11}$ accordingly supplies a negative voltage to the gate electrode of $FET_3$ to reduce $FET_3$ leakage current and thereby protect the storage capacitor $C_4$ from excess voltage. As described earlier, the storage capacitor $C_4$ also provides energy to the actuator-accessory coil when the voltage applied to terminals T1, T2 drops below the 30 volt level. The discharge path for the storage capacitor $C_4$ comprises the internal source-drain diode of $FET_3$, the actuator-accessory coil 35, $FET_2$, $FET_1$, diode $D_7$ and resistors $R_2$, $R_9$.

As described in the aforemetioned U.S. Pat. No 4,788,621, the undervoltage control circuit 46 is preferred over conventional RC energy storage circuits because of its low power dissipation at high input voltages which thereby allows the beneficial use of smaller-sized and lower-rated storage capacitors. The low power dissipation is provided by $FET_3$ in circuit with the storage capacitor $C_4$, whereby capacitor $C_4$ is charged through operation of $FET_3$ only during the rising part of the wave form of the AC voltage applied across input terminals T1, T2, typically between 30–80 volts. $FET_3$ remains off until the voltage again drops to less than 30 volts. Since the peak voltage appearing across the input terminals T1, T2 can exceed 350 volts, charging the storage capacitor $C_4$ at the lower voltage level is thus seen to be an important feature for providing the low power dissipation.

The use of the solid state switch 49 to control the impedance conditions presented to the fly-back diode $D_6$ is an important consideration when the protected circuit must be interrupted as soon as possible to prevent damage to sensitive associated electrical equipment upon the occurrence of an overcurrent condition. The provision of a low impedance path to the fly-back diode during normal operation and a high impedance path during an overcurrent condition insures instantaneous trip response as soon as the corresponding overcurrent trip signal is applied.

Having thus described my invention, what I claim as new and desire to secure by Letters Patent is:

1. A circuit breaker actuator-accessory unit circuit comprising:
    an undervoltage release electromagnetic coil;
    a spring-biased plunger associated with said coil;
    an undervoltage control circuit connected with said coil, said undervoltage circuit including means for interrupting holding current to said coil and allowing said plunger to propel into contact with a trip lever upon receipt of a predetermined undervoltage signal to said undervoltage circuit;
    an overcurrent control circuit interacting with said undervoltage circuit, said overcurrent circuit including means for interrupting said holding current upon receipt of a predetermined overcurrent signal to said overcurrent circuit; and
    a solid state switch interconnecting said undervoltage control circuit and said overcurrent control circuit with said electromagnetic coil for providing a first impedance to said electromagnetic coil in the absence of said predetermined overcurrent signal and a second impedance to said electromagnetic coil upon occurrence of said predetermined overcurrent signal, said second impedance being greater than said first impedance.

2. The circuit breaker actuator-accessory unit circuit of claim 1 wherein said solid state switch includes an FET connected with one side of said electromagnetic coil.

3. The circuit breaker actuator-accessory unit circuit of claim 2 including means across a gate and a source of said FET for limiting gate-source voltage to said FET.

4. The circuit breaker actuator-accessory unit circuit of claim 3 including means across said gate and said source for high frequency by-pass.

5. The circuit breaker actuator-accessory unit circuit of claim 3 wherein said gate-source voltage limiting means comprises a zener diode.

6. The circuit breaker actuator-accessory unit circuit of claim 4 wherein said high frequency by-pass means comprises a capacitor.

7. The circuit breaker actuator-accessory unit circuit of claim 1 wherein said overcurrent circuit interacts with said undervoltage circuit through an opto-isolator.

8. The actuator-accessory unit circuit of claim 7 wherein said opto-isolator includes a phototransistor connected with said undervoltage circuit through a first transistor switch and a photo diode connected with a first pair of input terminals for receiving said predetermined overcurrent signal.

9. The actuator-accessory unit circuit of claim 2 wherein said undervoltage circuit includes a first comparator connected with said electromagnetic coil and said FET through a second FET.

10. The actuator-accessory unit circuit of claim 3 including a third FET connected with said first comparator through a second comparator and a transistor switch.

11. The actuator-accessory unit circuit of claim 8 wherein a collector of said photo transistor connects with a gate on said FET and an emitter on said phototransistor connects with a source on said FET.

12. The actuator-accessory unit circuit of claim 2 including a fly-back diode connected with the cathode on one side of the electromagnetic coil and the anode connected to the source of said FET.

* * * * *

UNITED STATES PATENT AND TRADEMARK OFFICE
CERTIFICATE OF CORRECTION

PATENT NO.   : 4,890,184
DATED        : December 26, 1989
INVENTOR(S)  : Ronald R. Russell It is certified that error appears in the above-identified patent and that said Letters Patent is hereby corrected as shown below:

On the title page:

Assignee:  General Electric Company, New York, N.Y.

Signed and Sealed this

Fifteenth Day of January, 1991

*Attest:*

HARRY F. MANBECK, JR.

*Attesting Officer*    *Commissioner of Patents and Trademarks*